United States Patent
Bradley et al.

(10) Patent No.: US 6,243,366 B1
(45) Date of Patent: Jun. 5, 2001

(54) METHOD AND APPARATUS FOR PROVIDING INTERACTIVE TWO-WAY COMMUNICATIONS USING A SINGLE ONE-WAY CHANNEL IN SATELLITE SYSTEMS

(75) Inventors: James Frederick Bradley, Middletown; Paul W. Cooper, Red Bank, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/879,706

(22) Filed: Jun. 20, 1997

(51) Int. Cl.[7] .............. H04B 7/185; H04J 3/16; G08B 21/00

(52) U.S. Cl. .............. 370/318; 370/324; 370/467; 340/540

(58) Field of Search .............. 370/316, 319, 370/320, 328, 335, 342, 341, 445, 449, 450, 461, 462, 326, 321, 296, 435, 324, 282; 367/197–199; 340/540

(56) References Cited

U.S. PATENT DOCUMENTS

| | | | |
|---|---|---|---|
| 4,425,639 | * | 1/1984 | Acampora et al. .............. 370/323 |
| 4,979,170 | * | 12/1990 | Gilhousen et al. .............. 370/324 |
| 5,583,868 | * | 12/1996 | Rashid et al. .............. 370/394 |
| 5,835,487 | * | 11/1998 | Campanella .............. 370/316 |
| 5,864,544 | * | 1/1999 | Serinken et al. .............. 370/282 |
| 5,884,142 | * | 3/1999 | Wiedeman et al. .............. 455/12.1 |

* cited by examiner

Primary Examiner—Hassan Kizou
Assistant Examiner—Afsar M. Qureshi
(74) Attorney, Agent, or Firm—Kenyon & Kenyon

(57) ABSTRACT

A method and apparatus for doubling the capacity of a satellite communication system providing interactive two-way communications with a single one-way communication channel where two parties are utilizing earth stations located within a single satellite beam. Since in voice, facsimile and other types of communications only one user is usually transmitting at a time, a single one-way communication channel can be alternated between two or more users. Multiple users can thus share a single one-way channel since both earth stations are located within a single satellite beam, and therefore are effectively at both ends of the one-way channel.

4 Claims, 5 Drawing Sheets

METHOD AND APPARATUS FOR PROVIDING INTERACTIVE TWO-WAY COMMUNICATIONS USING A SINGLE ONE-WAY CHANNEL IN SATELLITE SYSTEMS

FIELD OF THE INVENTION

The invention relates to satellite systems. More particularly, the invention relates to a method and apparatus for users engaged in interactive two-way communications to utilize a shared one-way channel in a satellite communications system to increase system capacity.

BACKGROUND OF THE INVENTION

The demand for services offered over satellite communication systems is on the rise. For example, the ubiquitous coverage offered by satellite systems is highly desirable for various communication applications such as personal communication services, Internet access, local loop services, long distance services, cable television, commercial television, military operations and many others. In response to this demand, a number of large-scale satellite systems are scheduled for deployment in the near future.

As with all wireless communication systems, spectrum bandwidth is a valuable and limited resource in satellite systems. The term "spectrum bandwidth" refers to the difference between the two limiting frequencies of a band expressed in Hertz (Hz) For example, if a satellite system was assigned a range of frequencies between 2 GigaHertz (GHz) and 3 GHz, the bandwidth of the system would be considered 1 Ghz. Consequently, satellite systems attempt to utilize the bandwidth allocated to a system as efficiently as possible to improve the capacity of each system. The term "capacity" loosely refers to the system's overall potential for carrying or communicating information at any one point in time. This is sometimes measured by the number of users a system can service, or the total amount of information a system can transmit for all users simultaneously.

Satellite systems utilize a variety of techniques to improve bandwidth efficiency and system capacity. For example, satellite systems use multiple spot beams across the coverage area to facilitate spectrum reuse. Within each spot beam, satellite systems employ a number of different medium access techniques such as Time Division Multiple Access (TDMA), Frequency Division Multiple Access (FDMA), Code Division Multiple Access (CDMA), Space Division Multiple Access (SDMA), and so forth, to further share existing bandwidth with multiple users. Bandwidth is shared by dividing the total system bandwidth into logical groupings referred to as "information channels." The definition of a channel varies with the medium access technique used. For example, a satellite system using FDMA divides the total system bandwidth into subsets of frequencies, with each subset being considered an information channel. If the satellite system uses TDMA, then a channel would be a specific time slot. If the satellite system uses CDMA, then a channel would be a power level assignment labeled with a spreading code.

Satellite systems use information channels to carry information signals from one user to another user engaged in an interactive two-way communication, such as in a telephone conversation or facsimile transmission, or from one user to multiple users, such as in teleconferencing. A communications connection between users is referred to as a "call connection." These information signals are typically generated during a discrete time period, which is usually measured from the time a connection between users is initiated to when the connection is terminated ("call session"). It is normal to have satellite systems carrying information signals generated during call sessions from multiple call connections, simultaneously.

For a majority of satellite systems, the information channels can only transmit information in one direction ("one-way channel"). This is due primarily to current satellite network architecture and the type of equipment used within this network and terrestrial telephone networks. For example, most communication networks use digital repeaters and electronics that only provide transmission in one direction, such as broadcast satellite networks used for TV signal broadcasting. Broadcast satellite networks typically use one-way channels to distribute TV programs from a source location to multiple users.

One problem with conventional satellite systems employing one-way channels is that they are designed to use two one-way channels to provide full duplex interactive two-way communications between a pair of users, such as when completing a telephone call. This results in an inefficient use of bandwidth, as illustrated in more detail with reference to FIG. 1.

FIG. 1 illustrates a conventional satellite system, comprised of two communication sites. Each communication site includes a terminal 200, an earth station 202, and an antenna 204. Each communication site is connected via a satellite 206 using two one-way channels numbered 208 and 210, respectively.

As shown in FIG. 1, when user A calls user B using terminal 200, the two one-way channels 208 and 210 are established for the call. Channel 208 will be referred to as channel 1, and channel 210 will be referred to as channel 2. Channels 1 and 2 each have an up-link channel segment and a corresponding down-link segment to the receiving party. When user A speaks, the voice signals are transmitted using channel 1 on the up-link band (1U) to satellite 206, and continue on a corresponding channel 1 to user B in the down-link band (1D). Similarly, when user B speaks, the voice signals are transmitted on channel 2 in the up-link band (2U) to satellite 206, and down to user A on channel 2 in the down-link band (2D).

As shown in FIG. 1, conventional satellite systems must utilize two one-way channels to establish interactive two-way communications between users, with one channel being used for transmitting signals in one direction (e.g., from A to B) and another channel being used for transmitting signals in the opposite direction (e.g., from B to A). The inventors of the present invention, however, have recognized that in a typical voice conversation between users, one user remains silent while the other user speaks, and vice-versa. These periods of silence on average account for over 50% of the time during a typical call session. As a result, each channel in effect is used only one-half the time during a call session. The use of two one-way channels for a single call session, therefore, leaves one-half of the overall capacity of the system unused during normal two-party calls.

In view of the foregoing, it can be appreciated that a substantial need exists for a method and apparatus which improves the capacity of satellite systems by making use of the unused capacity created during a two-way interactive call connection using two one-way communication channels.

SUMMARY OF THE INVENTION

The invention is a method, and associated apparatus, for doubling the capacity of a satellite communication system providing interactive two-way communications with a single one-way communication channel where two parties are utilizing earth stations located within a single satellite beam. Since in voice, facsimile, and other types of communications only one user is usually transmitting at a time, a single one-way communication channel can be alternated between two or more paired-users. This is possible because multiple users can share a single one-way channel when both earth stations are located within a single satellite beam, and therefore are effectively at both ends of the one-way channel. The result is an approximate doubling of system capacity, while maintaining existing regulatory, power and spectral constraints. In addition to increasing the useful traffic load that can be carried on existing channel resources, this embodiment of the invention also diminishes processing and power requirements on a satellite.

Accordingly, in one embodiment of the invention, the assignment of the one-way communication channel is alternated between the two earth stations in accordance with which party is speaking at a particular time. This embodiment of the invention utilizes voice and data activity detection (VAD) and silence power suppression (SS) to minimize interference, minimize simultaneous use of the communication channel by both parties, and also to save power. The system monitors the communication channel for voice or data activity. If there is no activity, either earth station may start transmitting and use the channel. Once the channel is in use by a first earth station, the transmitter at a second earth station is blocked. The second earth station can only access the channel when the first earth station stops transmitting, and vice-versa. Other techniques for minimizing and/or managing simultaneous transmissions can also be implemented, as discussed in the detailed description below.

This embodiment of the invention can utilize any number of medium access methods, such as FDMA, TDMA, CDMA, or any combinations or variations thereof. Each medium access method provides additional features for sharing a one-way channel for two-way conversations. For example, in a satellite system utilizing CDMA, the first and second communication sites can be assigned unique spreading codes to further eliminate errors during periods of simultaneous transmission overlap.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
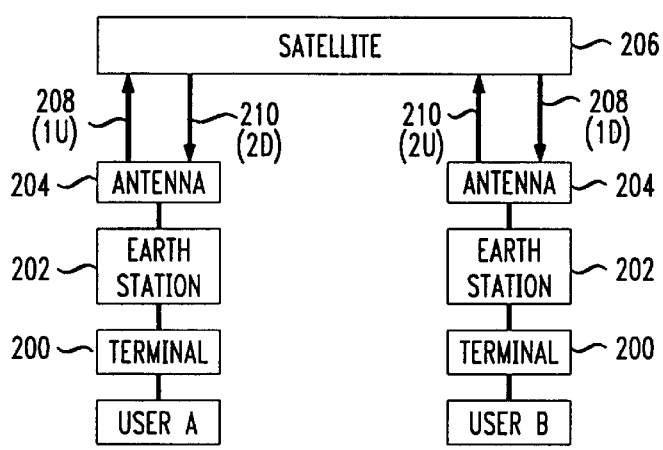
FIG. 1 (PRIOR ART) illustrates a conventional satellite system having a pair of communication sites.

Conventional satellite systems typically use two one-way channels for providing interactive two-way communications. One embodiment of the present invention, however, comprises a method and apparatus for providing interactive two-way communications using a one-way channel in a satellite system where two users are utilizing earth stations located within a single satellite beam. Both users in essence share a single one-way channel. Consequently, this embodiment of the invention is referred to as shared channel communications (SCC). As a result of sharing one channel, the second channel is released to other users within a system, thereby effectively doubling the useable channel capacity of conventional satellite systems.

The phrase "interactive two-way communications" as used herein refers to two-way communications between two or more users exchanging information according to a user's orders or responses. For example, a telephone conversation is an interactive two-way communication. Other examples would include paired facsimile communications, particularly Groups III and IV, and any communication involving voice, data and video operating in an interactive mode similar to that of a telephone call. Yet another example includes a client computer requesting a Hypertext Markup Language (HTML) document from a server through the Internet.

The inventors of the present invention have recognized two key concepts in inventing SCC. The first concept is that users engaging in interactive two-way communications ("paired-users"), such as a telephone conversation, have a special temporal usage relationship. When one user talks, the other listens. Therefore their individual silences match the times when the other is speaking. These periods of silence account for over 50% of the time during a typical call session. Consequently, in a conventional satellite system where two one-way channels are used to provide two-way communications, when a first user speaks on the first channel, the channel assigned to the second user remains silent, and vice-versa. Accordingly, only one-half of the capacity provided by the two one-way channels is used during a typical call session.

Moreover, the inventors have recognized that if both users utilize terminals connected to earth stations having antennas located within the same satellite transmission spot beam, both users have access to both ends of a one-way communication channel. This is due to a phenomenon unique to wireless systems, such as cellular systems and satellite systems, in that these systems are radio wireless systems. In a satellite system, earth stations having antennas within the same satellite transmission spot beam can both transmit and receive on any up-link and down-link channel available to the system. For example, it is possible for a user to transmit information on a one-way channel, and "listen" to their own transmissions at the other end of the one-way channel. To use an analogy, it is as if a single one-way communication channel was a pipe having an input end and an output end, and the pipe was "bent" in the middle to form a "U". When a pair of users utilize earth stations having antennas within the same satellite transmission beam, it is as if both users were physically located next to each other and could alternate using the input end of the bent pipe and listening to the output end of the bent pipe. It is worthy to note that this embodiment of the invention is based upon the premise that both earth stations are located within the same satellite transmission spot beam. Two communication sites (e.g., earth stations) engaged in interactive two-way communications are considered to be located within the same spot beam in accordance with this embodiment of the invention when both communication sites have antennas that can transmit and receive signals to the same satellite antenna used by a satellite, i.e., both earth station antennas are within the front lobe of the main transmission spot beam for an antenna used by the satellite.

Accordingly, the inventors recognized that it is possible to combine these two key concepts to effectively double the capacity of existing satellite systems, while maintaining existing regulatory, power and spectral constraints. Since paired-users are effectively at the beginning and end of a one-way channel, both users could share the one-way channel for interactive two-way communications. In other words, both users could take turns speaking and listening through the appropriate end of a single bent pipe. Further, voice overlap is reduced when sharing a one-way channel since it is natural in two-way conversations to alternate between speaking and listening. Voice overlap occasionally occurs when one user begins to speak before the other has stopped.

Figure 2:
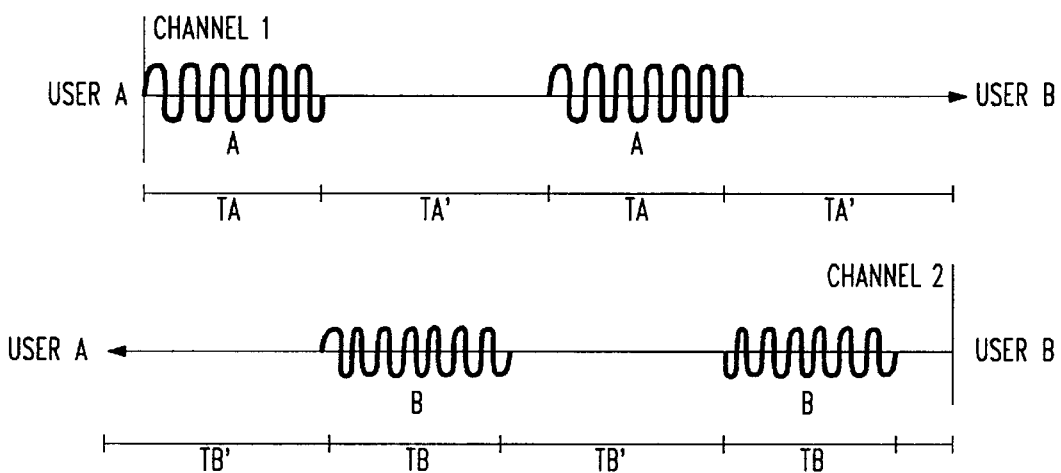
FIG. 2 (PRIOR ART) shows channel utilization during a voice call over a conventional system using two one-way channels for interactive two-way communications.

FIG. 2 shows channel utilization during a voice call over a conventional system using two one-way channels for interactive two-way communications. As shown in FIG. 2, user A transmits information signals to user B over channel 1 during the time periods labeled "TA." User A receives information signals from user B over channel 2 during the time periods labeled "TB". It can be appreciated that during time periods TA for channel 1, channel 2 is not utilized for periods TB'. Conversely, during time periods TB for channel 2, channel 1 is not utilized during time periods TA'.

Figure 3:
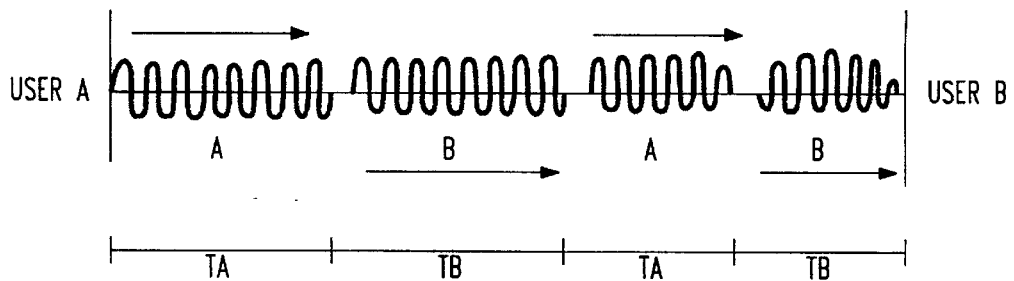
FIG. 3 shows channel utilization during a voice call in accordance with one embodiment of the present invention.

FIG. 3 shows channel utilization during a voice call in accordance with one embodiment of the present invention. As shown in FIG. 3, a single one-way channel is utilized for interactive two-way communications. Information signals for user A are transmitted to user B during time periods TA, and information signals from user B are received by user A during time periods TB. In other words, time periods TA correspond to the time periods when user B is listening, and time periods TB correspond to the time periods when user A is listening. Referring again to FIG. 2, it can be appreciated that the channel utilization shown in FIG. 3 takes advantage of the unused capacity during times TA' and TB' to consolidate the signals previously carried by two one-way channels into a single one-way channel.

It is worthy to note that SCC works with any conventional satellite system utilizing one-way channels. The benefits derived from this embodiment can be maximized for paired-users in a two-way communication, and especially in multi-party conference calls. Nevertheless, this embodiment of the invention is also advantageous for paired facsimile communications, particularly Groups III and IV, and any communication involving voice, data and video operating in an interactive mode similar to that of a telephone call. Furthermore, this embodiment of the invention is advantageous for analog or digital satellite systems, and for satellite systems using any medium access method, such as FDMA, TDMA, CDMA, or combinations thereof.

As a result of utilizing a single one-way channel rather than two one-way channels for interactive two-way communications, the capacity of a satellite system is approximately doubled. The benefits gained by a particular satellite system, however, may vary according to the type of system.

A satellite system using FDMA divides the total system bandwidth into subsets of frequencies, with each subset being considered an information channel. Thus, one embodiment of the invention makes available an additional subset of frequencies by using only a single one-way channel rather than two one-way channels for two-way communications. This subset of frequencies could be used for other call connections requested by users of a satellite system. Thus, SCC potentially doubles the capacity of FDMA systems.

If a satellite system uses TDMA, a channel would be a specific time slot. A spectral band on the up-link and a separate one on the down-link, e.g., of 10 megahertz (MHZ) each, are both fully utilized for periodic trains of samples-in-time from the transmissions of n users, wherein each user is assigned a time-position in the periodic train of slots. Assume for users engaged in interactive two-way voice communications, the one-way link from user A utilizes a time slot T1 for both the up-link and down-link. Further assume the one-way return link from user B utilizes time slot T2. Within the same beam, this embodiment of the invention permits users A and B to share the same time slot T1, since T1 is silent while T2 transmits user B's information signals and T2 is silent while T1 transmits user A's information signals. By both user A and B utilizing T1, T2 is released for another call connection. Channel T2 could therefore be used for other call connections. Thus, SCC also potentially doubles the capacity of TDMA systems.

If the satellite system uses CDMA, the gain in capacity becomes more complex to measure. In short, a CDMA channel would be a power level assignment labeled with a spreading code. Assume a spectral band of 10 MHZ. At any one time, n users are assigned to transmit over this band simultaneously. With individual transmissions spread over the entire spectrum of the 10 MHZ band, each user is allowed a specified power level for their transmission.

Hence, each individual CDMA channel can be defined as a power allotment identified by its code. For example, on a down-link band the satellite has available a specific level of power available for the aggregate transmission on a particular 10 MHZ band. The total power determines the number of allowable simultaneous users. Each user is provided enough power to satisfy performance requirements in overcoming the noise interference from ambient and external sources as well as the "noise power" of the other users of the channel. An example of performance requirements might be to not exceed a specified maximum bit-error-rate (BER). If the number of users were allowed to be greater than n, say m, the performance requirements might not be met. This would be true whether the m channels would have the same individual power levels or the same total power level as for the n channels. Thus, the overall spectral band allotted to a CDMA system can support n CDMA channels for a specific total power level.

Assume that n users are utilizing the CDMA system and sharing the spectral band at their full designated power levels. Assume that another user joins in and starts to transmit. In effect, n+1 channels would be in use. The entire system performance would be degraded. The effect, however, is somewhat different than for other medium access methods. For CDMA systems, every channel is degraded by a small amount. Every authorized subscriber experiences added noise and therefore a degradation in their communication. By way of contrast, in FDMA and TDMA systems, interference to a specific frequency channel or specific time slot creates interference for only the user of that frequency or time slot.

In an inter-beam or a conventional intra-beam CDMA system, user A is assigned an up-link channel and a corresponding down-link channel at user B's domain. The channels are identified with CDMA codes. User B is assigned a different channel to communicate with user A. Two full channels are thereby used for two-way communications. This embodiment of the invention lets user A and B share one CDMA channel, with which user A establishes the call. They each transmit during the other's silent periods. Together, both users sustain a continuous transmission of power, maintaining continuously the level allotted to their one common channel. As both users share the one channel, to the other n−1 channel-users the effect of A and B is that of a single noise source As B shares A's channel, B releases its own and thereby doubles the number of usable call-channels. This results in a potential doubling of system capacity for CDMA systems. All n "one-way" channels can therefore fully serve n voice calls, rather than having required twice n to accomplish the same thing as with conventional satellite systems.

Figure 4:
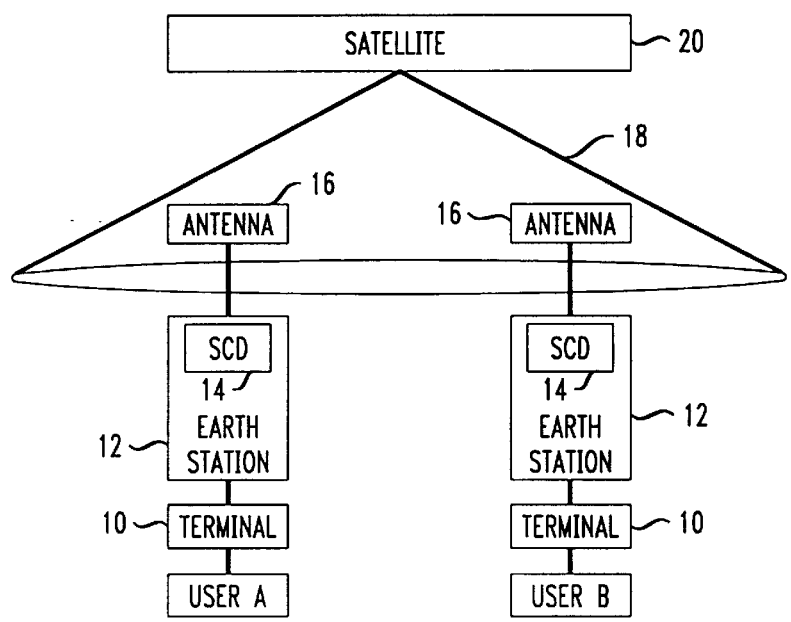
FIG. 4 illustrates a diagram of a satellite system suitable for practicing one embodiment of the invention.

FIG. 4 illustrates a diagram of a satellite system suitable for practicing one embodiment of the invention. It is worthy to note that although FIG. 4 illustrates one example of a satellite system, it can be appreciated that any satellite system utilizing one-way communication channels is appropriate for practicing this embodiment of the invention.

FIG. 4 shows a satellite system 8 having two communication sites. Each site includes a terminal 10, earth station 12, Shared Channel Device (SCD) 14 and antenna 16. As shown in each site, terminal 10 is connected to earth station 12. Earth station 12 includes SCD 14. Earth station 12 is connected to satellite antenna 16. Satellite antenna 16 is placed within a satellite beam 18 generated by a satellite 20. Satellite 20 may include a switch (not shown) for switching communications from one channel to another channel.

Satellite system 8 includes a satellite system control (not shown) for setting up a call connection in response to a request to establish a call session, and tearing down the call connection when a call session is terminated. The satellite system control can be modified to assign the earth stations used for interactive two-way communications to the same one-way channel to practice this embodiment of the invention.

Terminal 10 is a device permitting access to the satellite system, such as video Input/Output (I/O) equipment, audio I/O equipment, data application equipment, and so forth. Video I/O equipment 10 includes standard video equipment used for video telephone calls such as cameras and monitors, their control and selection, and video processing to improve compression or provide split-screen functions. Audio I/O equipment includes standard audio equipment used for audio telephone calls such as a microphone and loudspeaker, telephone instrument or equivalent, attached audio devices providing voice activation sensing, multiple microphone mixers, and acoustic echo cancellation. Data application equipment includes computers, facsimile machines, telematic visual aids such as electronic whiteboards, and so forth.

Terminal 10 is connected to earth station 12. Earth station 12 refers to a terrestrial station with the requisite equipment to provide a direct communications link to satellite 20, such as a microwave transmitter and receiver ("transceiver"). Typically, earth station 12 is connected to multiple terminals 10, and utilizes a switch (not shown) to route information to the appropriate terminal. Alternatively, terminal 10, earth station 12 and antenna 16 may be a mobile terminal or even a handhold telephone device.

Satellite system 8 utilizes one-way channels to carry either analog or digital transmission signals between earth stations via satellite 20. Satellite 20 operates on a number of frequency bands, called transponder channels, or simply, transponders. Satellite 20 receives transmissions on one frequency band (uplink), amplifies (in the case of analog transmissions) or repeats (in the case of digital transmissions) the signal, and transmits it on another frequency (downlink). Satellite 20 also may provide switching functions to route calls to different earth stations, to earth stations in other beams, or to other satellites in the constellation. Satellite 20 may be one of the group comprising geosynchronous earth orbit (GEO) satellites (GEO); mid-earth orbit (MEO) satellites, low earth orbit (LEO) satellites, balloon satellites, and airborne platform satellites. Satellite 20 can be used to provide point-to-point, point-to-multipoint, and multipoint-to-multipoint communications between earth stations 14.

Satellite 20 generates multiple satellite beams one of which is satellite beam 18. Satellite 20 uses microwave transceivers and antennas to transmit and receive signals to and from earth stations. A satellite transceiver used in satellite 20, for example, generates a transmission signal via a satellite antenna that produces a main transmission spot beam that can be received by earth stations within a specified area of the earth. A satellite transmitter might generate a transmission spot beam that is, for example, 300 miles in diameter. Similarly, satellite 20 utilizes satellite antennas for receiving signals transmitted from earth stations across all the coverage area. It is worthy to note that two communication sites (e.g., earth stations) engaged in interactive two-way communications are considered to be located within the same spot beam in accordance with this embodiment of the invention when the communication sites have antennas that can transmit and receive signals to the same satellite antenna used by satellite 20, i.e., they are both within the front lobe of the main transmission spot beam for an antenna used by satellite 20.

Figure 5:
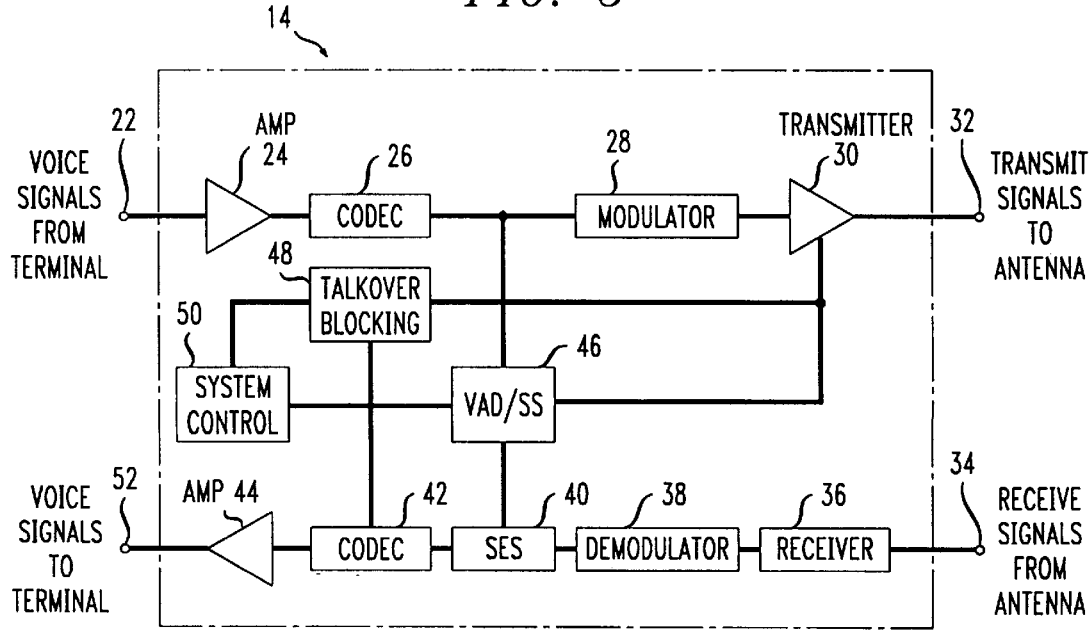
FIG. 5 is a block diagram of an example of a shared channel device (SCD) used in accordance with one embodiment of the invention.

FIG. 5 is a block diagram of an example of a shared channel device (SCD) used in accordance with one embodiment of the invention. SCD 14 accomplishes key functionality for SCC. SCD 14 ensures that maintenance of a call connection during a call session is performed to adequately maintain two-way communications over the shared one-way channel in accordance with desired performance parameters.

SCD 14 includes a transmitting and receiving circuit. For transmitting satellite signals, SCD 14 comprises an input 22 connected to an amplifier 24. Amplifier 24 is connected to a voice coder/decoder (codec) 26, which is in turn connected to a modulator 28. Modulator 28 is connected to a radio-frequency (RF) transmitter 30, which is connected to output 32 for passing signals to antenna 16. For receiving satellite signals, SCD 14 comprises an input 34 connected to an RF receiver 36. Receiver 36 is connected to a demodulator 38, which is connected to a Self-Echo Suppression (SES) device 40. SES 40 is connected to a codec 42, and codec 42 is connected to an amplifier 44, which is in turn connected to an output 52. Both the transmit and receive components of SCD 14 are connected to a system control unit (SCU) 50, talkover blocking unit (TBU) 48, and a Voice Activity Detector/Silence Power Suppressor (VAD/SS) 46.

As shown in FIG. 5, information signals are received by input 22. Information signals include signals generated by terminal 10, including voice, audio, facsimile, modem, image, video and data signals. The information signals can be either analog signals or digital signals. If analog signals, the information signals will be converted to digital signals prior to being compressed by codec 26.

In this embodiment of the invention, digital voice signals from terminal 10 are received at input 22. These signals are amplified using amplifier 24. The amplified signals are passed through codec 26, that compresses the voice signals into a fewer number of bits. The compressed signals are then modulated by a modulator 28. The modulated signals are received by an RF transmitter 30, and passed to output 32 for transmission by antenna 16.

Received signals from antenna 16 are received at input 34, and passed to receiver 36. Demodulator 38 demodulates the received signal and sends the received signal to SES 40. SES 40 performs echo suppression (i.e., cancellation) for self-generated demodulated signals, and sends the signals to decoding by codec 42. The decoded signals are amplified by amplifier 44, and sent to terminal 10 via output 52.

SCU 50 generates logic control signals for SCD 14. In particular, SCU 50 provides logic control signals for controlling VAD/SS 46, TBU 48 and SES 40. SCU 50 could be implemented using a central processing unit (CPU) used by the earth station 12 or terminal 10, or a dedicated CPU. The CPU includes any processor of sufficient processing power to perform the SCC functionality. The overall functioning of SCD 14 is controlled by the CPU, which operates under the control of executed computer program instructions that are stored in main memory. Main memory may be any type of machine readable storage device, such as random access memory (RAM), read only memory (ROM), programmable read only memory (PROM), erasable programmable read only memory (EPROM), electronically erasable programmable read only memory (EEPROM), magnetic storage media (i.e., a magnetic disk), or optical storage media (i.e., a CD-ROM).

Modules 40, 46 and 48 implement the main SCD functionality for satellite system 8. It is noted that modules 40, 46 and 48 are shown as separate functional modules in FIG. 5. It can be appreciated, however, that the functions performed by these modules can be further separated into more modules, combined together to form one module, or be distributed throughout the system, and still fall within the scope of the invention. Further, the functionality of these modules may be implemented in hardware, software, or a combination of hardware and software, using well-known signal processing techniques.

VAD/SS 46 performs voice activity detection and silence power suppression to minimize interference, to minimize simultaneous use of the communication channel by both parties, and also to save power. VAD/SS accomplishes these functions by suppressing power to a transmitter for a receiving earth station. To be effective in the interleaving and sharing of a single channel by a paired-users engaging in interactive two-way communications, the silent periods of each must be reinforced by cutting or suppressing the power to the transmitter of one user while the other is speaking. When a call connection between two users is established, the VAD/SS 46 of the receiving ("listening") user suppresses power to the transmitter of the receiving earth station once VAD/SS 46 detects voice information signals from the transmitting user during a call session. It is worthy to note that although power to the transmitter of the receiving earth station is suppressed, power is applied to the one-way channel virtually continuously during a call session as both users alternate transmissions. As a result, VAD/SS 46 allows only the active communicator to deliver power to the shared channel at any given moment, thereby minimizing channel interference, conserving power, and preventing voice transmission overlap. Voice transmission overlap is discussed in more detail as follows.

Voice transmission overlap occurs when one user begins to speak before the other has stopped. Should both users speak at the same time, the overlap causes interference, and in some systems, disruption. For example, in an analog system wherein linear superposition holds, the human ear can deal with the babble that voice overlap creates since the integrity of the component utterances are sustained. In these systems overlap merely degrades the quality of the overall signal. In a digital system, however, the sum of two digital transmission signals can represent an unintelligible combination to a receiver. Further, propagation delay in most satellite systems already deteriorates voice quality to some degree. Voice transmission overlaps may add to this deterioration, and thus must be minimized in some systems. It is worthy to note, however, that propagation delay may in some instances negate any degradation in signal created by voice transmission overlaps, as discussed later.

Another technique useful for minimizing the deleterious effects of voice transmission overlap includes alternating use of the one-way channel between the communication sites by using a token to control communications. A communication site can only transmit on the one-way channel when it receives a token or acknowledgment from the SCD 14 of the other communication site. Once the communication site receives the token it can begin transmitting information using the one-way channel. When the communication site is finished transmitting, the communication site passes the token to the other communication site. As with the previous method of alternating use of the one-way channel, power could be cut by VAD/SS 46 for the transmitter of the receiving user to further minimize voice transmission overlap once the communication site holding the token begins transmitting.

Yet another method for minimizing voice transmission overlap is to utilize a low frequency subcode to modulate the talkers voice signals providing a controlled separation. For example, the controlled separation could be approximately 3 decibels (dB).

SES 40 is used to cancel the self-generated delayed return signal a communication site has transmitted while this site listens to the transmission arriving from another communication site. Since a satellite system is a broadcast system, a communication site can actually receive its own transmission. This transmission is referred to as a delayed return signal. The delayed return signal can confuse the talker and interferes with the reception of transmission signals from another communication site. SES 40 cancels out the delayed return signal to minimize this interference when the signal constitutes self-echo.

TBU 48 performs the function of preventing a user from speaking while another user is already speaking ("talkover"). In operation, VAD/SS 46 turns off the transmitter for an earth station receiving transmission signals from the other paired-user. When the functions for TBU 48 are enabled (see Table 1 below), TBU 48 prevents a receiving user from overriding the VAD/SS 46 for their terminal to talkover the other party's transmission. When the functions for TBU 48 are enabled, a receiving user must wait until the transmitting user is finished, and depending on the alternating technique used, wait for either: (1) a silence period to be detected by its receiver codec 42; or (2) a token is passed to its SCU 50. When the functions for TBU 48 are disabled, a user is permitted to override the VAD/SS 46 for their terminal to talkover the other party's transmission. TBU 48 is unnecessary for analog satellite systems, where talkover is understandable to both satellite receivers and users, thereby allowing users to engage in a more natural conversation.

Whether SCD 14 utilizes the functionality of SES 40, TBU 48, and VAD/SS 46 for a particular satellite system depends on at least three factors: (1) the medium access method used by the system; (2) modulation technique; and (3) the voice overlap suppression technique used. When SCD 14 utilizes the functionality provided by modules 40, 46 and 48 is summarized in Table 1.

TABLE 1

|  |  |  | CDMA | | |
|---|---|---|---|---|---|
|  | FDMA | TDMA | Digital Single Code | Digital Two | |
| Modulation | Analog | Digital | Digital | fixd | dsyn | Codes |
| VAD/SS | Yes | Yes | Yes | Yes | Yes | Yes |
| TBU | No | Yes | Yes | Yes | No | No |
| SES | Yes | Yes | Yes | Yes | Yes | No |

Once the functionality of SES 40, TBU 48 and/or VAD/SS 46 is enabled for a particular system, when the SCDs 14 of either communication site actually utilizes the functionality of SES 40, TBU 48, and VAD/SS 46, depends on whether a communication site is transmitting or receiving signals.

Table 2 summarizes each state (off or on) of modules 40, 46 and 48 for when a communication site is transmitting (T) or receiving (R) signals.

TABLE 2

|  |  |  | CDMA | | |
|---|---|---|---|---|---|
|  | FDMA | TDMA | Digital Single Code | Digital Two | |
| Modulation | Analog | Digital | Digital | fixd | dsyn | Codes |
| VAD/SS (T) | Off | Off | Off | Off | Off | Off |
| VAD/SS (R) | On | On | On | On | On | On |
| TBU (T) | N/A | Off | Off | Off | N/A | N/A |
| TBU (R) | N/A | On | On | On | N/A | N/A |
| SES (T) | On | On | On | On | On | N/A |
| SES (R) | Off | Off | Off | Off | Off | N/A |

Tables 1 and 2 will be discussed in more detail with the methods described with reference to FIGS. 3 and 4.

Figure 6:
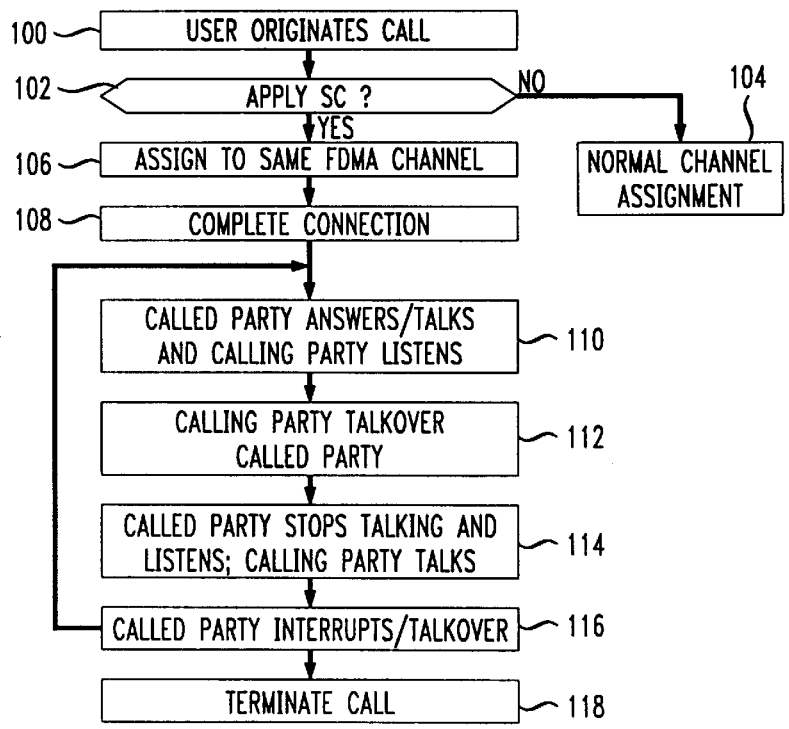
FIG. 6 shows a block-flow diagram of the steps performed in an analog satellite system using FDMA in accordance with one embodiment of the invention.

FIG. 6 shows a block-flow diagram of the steps performed in an analog satellite system using FDMA in accordance with one embodiment of the invention. The following steps assume that a satellite system similar to satellite system 8 is used. Further, it is assumed that the satellite system is an analog system using FDMA. As shown in Table 1, the functions for VAD/SS 46 and SES 40 are enabled, while TBU 48 is disabled. The reason TBU 48 is disabled is that in analog systems wherein linear superposition holds, the combination of signals created by voice transmission overlaps can still be received and interpreted by the system. Therefore, TBU 48 is not necessary to prevent the interference or disruption of received signals.

As shown in FIG. 6, a user A dials a telephone number to initiate a call to user B via terminal 10 at step 100. At step 102, SCU 50 analyzes the telephone numbers for user A and user B to determine whether it is appropriate to use a single one-way channel for the call connection. For example, SCU 50 determines whether terminals 10 used by user A and user B are connected to earth stations 12 having antennas 16 within the same satellite transmission beam 18. Further, SCU 50 determines whether the two-way communications are interactive in nature, such as a telephone call. If conditions are not appropriate at step 102, normal channel assignment for satellite system 8 occurs at step 104. If conditions are appropriate at step 102, system call control (i.e., call set-up and tear-down procedures and their associated hardware) assigns user A and user B to the same FDMA channel, i.e., the same up-link frequency and the same down-link frequency, at step 106. At step 108, terminal 10 for user B rings and user B picks up the handset for terminal 10, at which point a call connection is established, and a call session begins.

Once a call session begins, user B begins speaking and user A listens at step 110. As shown in Table 2, VAD/SS 46 for user A is turned ON to prevent user A from putting power onto the one-way channel when user B is transmitting. Further, SES 40 for user A is turned OFF since user A is not generating a delayed return signal. In addition, user A's receiver is turned ON to receive transmissions from user B. Conversely, VAD/SS 46 for user B is turned OFF since there is no need to suppress power to user B's transmitter given that user B is speaking, and SES 40 is turned ON to cancel the delayed return signal caused by user B's transmissions. Since user B might receive voice overlap transmissions, user B's receiver is turned ON as well.

At step 112, user A begins speaking while user B is speaking and creates voice transmission overlap. User A's VAD/SS 46 is turned OFF, and user A's RF energy is added to user B's RF energy over the one-way channel. Both users are capable of hearing the other's talkover. User A's SES 40 and user B's SES 40 are both turned ON. In this case SES 40 subtracts the self-echo signal and passes the far end talker's signal.

At step 114, user B stops talking and listens for user A. User A begins speaking. User B's VAD/SS 46 is turned ON, and SES 40 turned OFF. User A's VAD/SS 46 is turned OFF, and SES 40 turned ON. Both users' receivers remain ON.

At step 116, user B begins speaking while user A is speaking. User B's VAD/SS 46 is turned OFF, and user B's RF energy is added to user A's RF energy over the one-way channel Both users are capable of hearing the other's talkover. User A's and user B's SES 40 are both turned ON. SES 40 subtracts the self-echo signal and passes the far end talker's signal.

Steps 110 to 116 are repeated until either user hangs up their handset. The system then terminates the call session and call connection at step 118.

Figure 7:
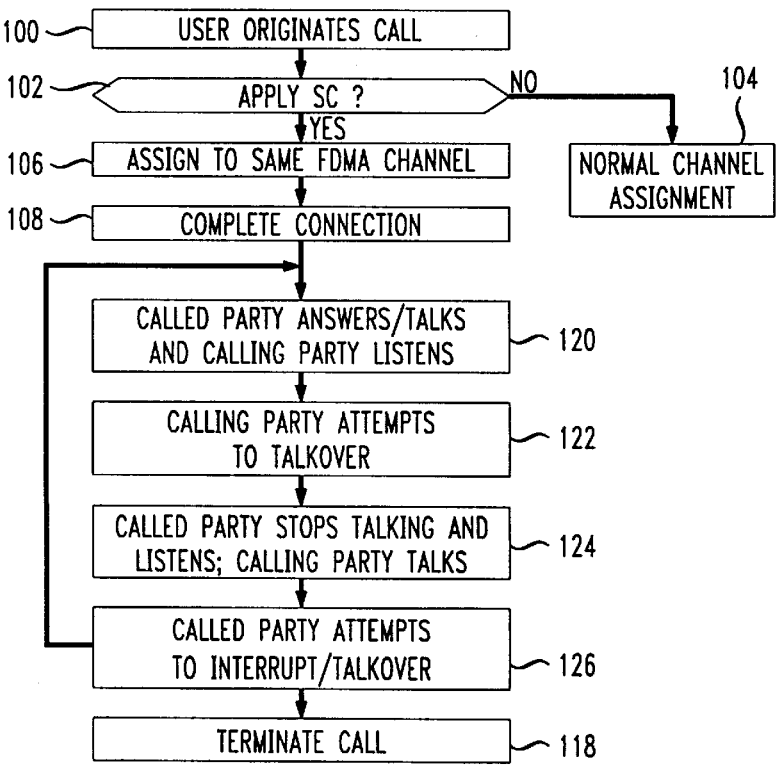
FIG. 7 shows a block-flow diagram of the steps performed in a digital satellite system using FDMA in accordance with one embodiment of the invention.

FIG. 7 shows a block-flow diagram of the steps performed in a digital satellite system using FDMA in accordance with one embodiment of the invention. The following steps assume that a satellite system similar to satellite system 8 is used. Further, it is assumed that the satellite system is a digital system using FDMA. As shown in Table 1, the functions for VAD/SS 46, TBU 48 and SES 40 are enabled.

As shown in FIG. 7, steps 100, 102, 104, 106, 108 and 118 are similar to the steps discussed with reference to FIG. 6. Once a call session begins at step 108, user B begins speaking and user A listens at step 120. As shown in Table 2, VAD/SS 46 for user A is turned ON to prevent user A from putting power onto the one-way channel while user B is transmitting, and TBU 48 is turned ON to prevent user A from overriding its VAD/SS 46 if user A desires to interrupt user B while user B is speaking. Further, SES 40 for user A is turned OFF since user A is not generating a delayed return signal. In addition, user A's receiver is turned ON. Conversely, VAD/SS 46 for user B is turned OFF since there is no need to suppress power to user B's transmitter given that user B is speaking, TBU 48 is turned OFF since user B is speaking, and SES 40 is turned ON to cancel the delayed return signal caused by user B's transmissions. Alternatively, User B's receiver is turned OFF.

At step 122, user A attempts to speak while user B is speaking. User A's TBU 48, however, is turned ON thereby preventing the transmitter for user A from putting RF energy into the shared one-way channel.

At step 124, user B stops talking and listens for user A. User A begins speaking. User B's VAD/SS 46, TBU 48 and receiver are turned ON, and SES 40 is turned OFF. User A's VAD/SS 46 and TBU 48 are turned OFF, and SES 40 turned ON. The receiver may be turned OFF as an alternative to having SES 40 turned ON.

At step 126, user B attempts to speak while user A is speaking. User B's TBU 48, however, is turned ON thereby preventing the transmitter for user B from putting RF energy into the shared one-way channel.

Steps 120 to 126 are repeated until either user hangs up their handset. The system then terminates the call session and call connection at step 118.

Satellite systems employing CDMA offer additional opportunities for implementing SCC, particularly in the area of minimizing any deleterious effects of voice transmission overlap. This embodiment of the invention applies to both asynchronous and synchronous CDMA.

At least three methods can be used for sharing a one-way channel for interactive two-way communications over a satellite system using CDMA. The first method is to assign a single CDMA code to both parties in a two-party voice call. This lends itself to code efficiency, which may be desirable for some systems. When voice overlap occurs, the mutual interference is partly coherent and partly incoherent depending upon the degree of phase synchronism between the communication sites' respective streaming of their common CDMA code. The short periods of disturbing overlap can be ignored or can be minimized utilizing voice transmission overlap prevention techniques described previously.

Voice transmission overlap can be minimized when a single CDMA code is shared by both users since a recipient already has a replica of her own transmission and can thereby, in principle, subtract it out from the composite transmission received. This, in essence, provides self-echo suppression. In order to properly use a subtraction method for a single code CDMA system, it is necessary that the replica be of the same form and amplitude as its component in the received communication.

Figure 8:
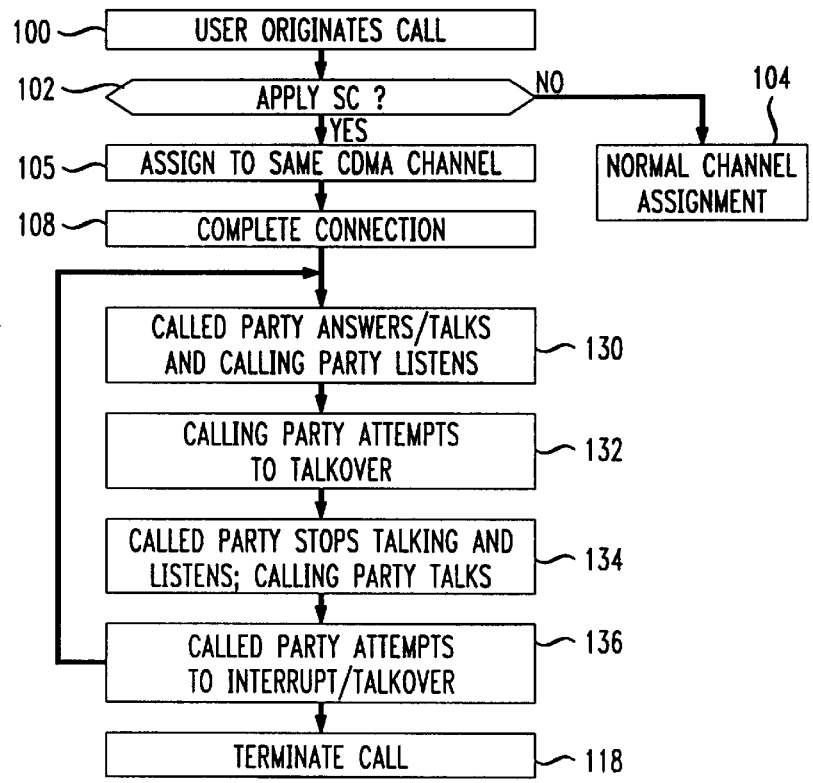
FIG. 8 shows a block-flow diagram of the steps performed in a satellite system using CDMA and one CDMA code in accordance with one embodiment of the invention.

FIG. 8 shows a block-flow diagram of the steps performed in a satellite system using CDMA and one CDMA code in accordance with one embodiment of the invention. The following steps assume that a satellite system similar to satellite system 8 is used. Further, it is assumed that the satellite system uses CDMA and a single CDMA code for sharing a one-way channel for interactive two-way communications. As shown in Table 1, the functions for VAD/SS 46, TBU 48 and SES 40 are enabled.

As shown in FIG. 8, steps 100, 102, 104, 108 and 118 are similar to the steps discussed with reference to FIG. 6. Step 105 is similar to step 106 discussed with reference to FIG. 6, except that system call control assigns both users a single CDMA code rather than a FDMA frequency.

Once a call session begins at step 108, user B begins speaking and user A listens at step 130. As shown in Table 2, VAD/SS 46 for user A is turned ON to prevent voice transmission overlap, and TBU 48 is turned ON to prevent user A from overriding its VAD/SS 46 if user A desires to interrupt user B while user B is speaking. Further, SES 40 for user A is turned OFF since user A is not generating a delayed return signal. Conversely, VAD/SS 46 for user B is turned OFF since there is no need to suppress power to user B's transmitter given that user B is speaking, TBU 48 is turned OFF since user B is already speaking, and SES 40 is turned ON to cancel the delayed return signal caused by user B's transmissions.

At step 132, user A attempts to speak while user B is speaking. User A's TBU 48, however, is turned ON thereby preventing the transmitter for user A from putting RF energy into the shared one-way channel.

At step 134, user B stops talking and listens for user A. User A begins speaking. User B's VAD/SS 46 and TBU 48 are turned ON, and SES 40 is turned OFF. User A's VAD/SS 46 and TBU 48 are turned OFF, and SES 40 turned ON.

At step 136, user B attempts to speak while user A is speaking. User B's TBU 48, however, is turned ON thereby preventing the transmitter for user B from putting RF energy into the shared one-way channel.

Steps 130 to 136 are repeated until either user hangs up their handset. The system then terminates the call session and call connection at step 118.

A second method for sharing a one-way channel for interactive two-way communications in a satellite system using CDMA is to assign a single CDMA code to both users in a two-party voice call similar to the first method discussed previously. In the second method, however, the two users deliberately desynchronize their respective renditions of their common CDMA code as used in their respective transmissions, thereby making their received components separable and intelligible to each other.

A third method for sharing a one-way channel for interactive two-way communications in a satellite system using CDMA is to use two CDMA codes. Using two CDMA codes, both users' antennas receive simultaneously the same composite transmission made up of both of their component transmissions representing the other party's transmission and their own, all returning together on the same down-link. Each of the two component transmissions is under a different CDMA code. Each party uses the appropriate CDMA code to decode the message intended for it by the other member. The simultaneously returned self-message appears as noise, as with all of the transmissions generated by other call connections during other call sessions. Transmissions from other users appear as noise to each user of the CDMA system. This is true for voice transmission overlaps as well.

Voice overlap adds an additional noise burden on the entire band during an interval of overlap. The impact, however, may be quite modest since these intervals are short. A probability/statistical interpretation was used to model this impact. Assume that each user in a paired-user call speaks for half the time. Further assume that both users overlap for 10% of a user's speaking time, and therefore there is also complete silence for 10% of the time. In addition, assume that at any instant of time the probabilities that there are 0, 1, or 2 parties speaking on a particular call are, respectively, 0.05, 0.9, 0.05. It was also assumed that the band has 100 "channels" (power allotments) allowing for 100 speakers at one time (would allow for 200 paired-parties on 100 calls, were there no overlap). With 93 calls assigned at the same time (186 paired parties), the normally distributed variate X representing the number of speakers talking at an instant has a mean of $\mu$=93, a standard deviation of $\delta$=3.09. Further, the probability that at any instant there are no more than 100 speakers is 99%, and that there are no more than 102 is 99.87%.

If it is assumed that each party talks for 40% of the time, and there is an overlap of 10% of a speaker's talking time, then the probabilities that on a call there are 0, 1, or 2 speakers talking at any instant are, respectively, 0.24, 0.72, 0.04. Then with 110 calls assigned at the same time (220 paired parties), X has $\mu$=88 and $\delta$=5.14. In addition, the probability that there are no more than 100 speakers at once is 99%, and that there are no more than 103 is 99.87%.

There are at least two methods of using two CDMA codes to share a single one-way channel. The first method involves assigning each user its own CDMA code. Each user utilizes its CDMA code for both transmission and reception, and has no knowledge of its partner's code. The impact of voice overlap on the shared channel is a relatively small amount of additional noise during the relatively short period of overlap. Although the user need only process one CDMA code, the satellite must do a mapping using the satellite switch. For example, if satellite 20 receives a transmission from user A, satellite 20 decodes it using its own reference of code A, recodes it with code B, and retransmits A's message to user B using code B. Similarly, satellite 20 retransmits messages from B to A while mapping from code B to code A.

The second method involves assigning a CDMA code to each direction of a two-way communication link. For example, one CDMA code is assigned for the full transmission from A to B ("code AB") and the other is assigned for transmission from B to A ("code BA"). In this manner, a communication site's self-returned transmission appears as noise during overlap with the transmission received from the other user. Each user utilizes opposite codes for transmitting and for receiving, e.g., user A transmits with code AB and receives with code BA. It is important to note that there is no demand for code-mapping by the satellite, thereby dramatically reducing the processing required by the satellite. In essence, the satellite acts merely as a "bent pipe". This method for minimizing deleterious effects of voice overlap is one of the most cogent.

Figure 9:
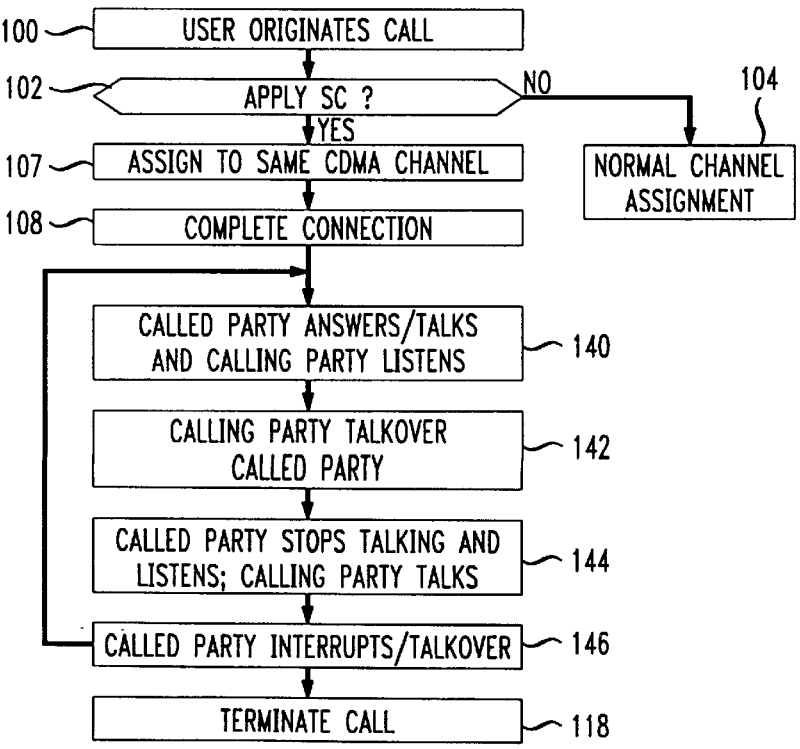
FIG. 9 shows a block-flow diagram of the steps performed in a satellite system using CDMA and two CDMA codes in accordance with one embodiment of the invention.

FIG. 9 shows a block-flow diagram of the steps performed in a satellite system using CDMA and two CDMA code in accordance with one embodiment of the invention. The following steps assume that a satellite system similar to satellite system 8 is used. Further, it is assumed that the satellite system uses CDMA and two CDMA codes for sharing a one-way channel for interactive two-way communications. As shown in Table 1, the functions for VAD/SS 46 are enabled, and TBU 48 and SES 40 are disabled. SES 40 is disabled since each party uses a different CDMA code to decode the message intended for it by the other member. The simultaneously returned self-message appears as noise, as with all of the transmissions generated by other call connections during other call sessions. Thus the effects of the returned self-message are automatically minimized. TBU 48 is disabled since two codes allow simultaneous RF transmission.

As shown in FIG. 9, steps 100, 102, 104, 108 and 118 are similar to the steps discussed with reference to FIG. 8. Step 107 is similar to step 105 discussed with reference to FIG. 8, except that system call control assigns each user a CDMA code rather a single code for both users.

Once a call session begins, user B begins speaking and user A listens at step 140. As shown in Table 2, VAD/SS 46 for user A is turned ON to prevent user A from putting power onto the one-way channel when user B is transmitting. VAD/SS 46 for user B is turned OFF since there is no need to suppress power to user B's transmitter given that user B is speaking.

At step 142, user A begins speaking while user B is speaking and creates voice transmission overlap. User A's talkover is received by user B since two codes allow simultaneous RF transmission. Instantaneous power is doubled during talkover.

At step 144, user B stops talking and listens for user A. User A begins speaking. User B's VAD/SS 46 is turned ON, and user A's VAD/SS 46 is turned OFF.

At step 146, user B begins speaking while user A is speaking. User B's talkover is received by user A.

Steps 140 to 146 are repeated until either user hangs up their handset. The system then terminates the call session and call connection at step 118.

In order to approximate the improvement to capacity of a satellite system using a one-way channel for providing two-way communications, a statistical model was developed. As a baseline reference, consider the usual digital call structure where paired parties in a call are not assigned the same channel. In a particular spectral band, all the transmissions (representing transmissions from one party in each paired-call, and from many calls) are in random phase with one another, i.e., their periods of activity and silence are unrelated among the calls. A standard method for taking advantage of the voice silences when transmitting on relatively "expensive" facilities such as undersea cable and early satellites links is using a Time Assignment Speech Interpolation (TASI) System. This technique is feasible only for point-to-point trunks and is not feasible for multipoint-to-multipoint calls. This method, working in a TDMA-type context, buffers calls, samples them in a deterministic sequence, and transmits each as openings occur by virtue of silences in the voice calls underway and in actual transmission. At any one instant only an allowable number of calls are in instantaneous transmission. But as a result of utilizing the silence periods as they occur, the number of calls that could be transmitted at a time is considerably more than the allowable instantaneous number, perhaps by a factor of 2 to 2.5. The circuitry is complex and of considerable expense, and is justifiable only because of the greater expense and scarcity of the facility itself.

Another method includes statistical multiplexing, which to some extent is appropriate for Global Systems for Mobile Communications (GSM). In a CDMA system, the spectral band in question can handle L voice transmissions instantaneously without stressing its limitations, i.e., it is allowed L channels (power allotments). By allowing N callers to conduct their calls simultaneously, N>>L , the capacity is increased accordingly. Because of the voice silences in each call, the number actually transmitting at any instant is X, $0 \leq X \leq N$. On each call the power is suppressed during the voice silences. Taking the activity time proportion as $\Delta$ for each call, letting $\Delta$ be fixed for this example, at any instant of time the probability that in any specific call the voice is active is equal to $\Delta$. For large N, X is effectively a normally distributed variate with mean $\mu$=N $\Delta$ and Variance=N$\Delta$(1–

Δ). With standard deviation σ equal to the square root of the variance, the probability that at any instant the number of active voice transmissions is greater than 2.3σ above the mean is 0.01 and the probability that it is greater than 3σ is 0.0013.

For example, with voice activity Δ=0.5 for N=170 and μ=85, the probability that the instantaneous number of active speakers X is not more than 100 is 99% and the probability that the number is not more than 104 is 99.87%. Using, instead, the statistic that most voice calls are active only 40% of the time, corresponding to Δ=0.4 for N=208 and μ=83.2, the probability that X≦100 is 99% and the probability that X≦104 is 99.87%. Thus, if the number of channel allotments L is 100, then with a voice-activity percentage of 40% of the time, 208 callers can be on the band with a probability of 99% that the instantaneous number actively speaking would not exceed 100. The other numbers can be similarly interpreted.

It is worthy to note that for a shared one-way channel, taking 40% voice activity, for each paired-call Δ=0.8, and with N/2 being the number of calls allowed and X/2 the number of calls with voice activity at any instant, for N/2=112, the probability that X/2 ≦100 is 99% and the probability that X/2≦102 is 99.87%. With these same tolerances, N=224 is the number of parties that can share the band at one time. In this case, a shared one-way channel is used in its deterministic sense, and superimposed on that is a modest statistical multiplexing taking advantage of the fact that some silences still remain on each assigned channel.

Table 3 provides a summary comparison of the satellite system capacity using SCC. The symbols are the same as in the text: for a CDMA spectral band with 100 power allotments (channels), N is the number of parties that can be assigned to that band in order to meet the conditions defined by the other symbols. The 10% in the first column indicated an assumption of 10% voice overlap. NR signifies not relevant, at least for this comparison. Give N as shown, T and S are determined. Viewed another way: specify T, as shown, so that T+100, whereby the probability is 0.01 that at any instant the number of users (X) talking is no more than 100. Then N follows, and N is the number of users that can be assigned to the one-way channel so that X≦T with Prob=0.99. So, choosing T first in turn determines N (the channel "capacity"), whence N determines S.

TABLE 3

| Method | % Voice Activity/ % overlap | N = Number of Parties Assigned to one-way channel | μ | T, where Prob = 0.99 that X ≦ T | S, where Prob = 0.9987 that X ≦ S |
|---|---|---|---|---|---|
| Standard | NR | 100 | NR | NR | NR |
| SCC | 50/0 | 200 (100 calls) | 100 | NR | NR |
| SCC 10% | 50/10 | 186 (93 calls) | 93 | 100 | 102 |
| SCC 10% | 40/10 | 220 (110 calls) | 88 | 100 | 102 |
| Stat Mux | 50 | 170 | 85 | 100 | 103 |
| Stat Mux | 40 | 208 | 83 | 100 | 104 |

Satellite systems using CDMA and SCC also offer the advantage of enhancing self-echo cancellation. The deleterious effects of propagation delay with GEO satellites on voice communication are well recognized. Since both parties on a call receive the down-link transmission simultaneously, they both receive the content at the same instant. With use of echo cancellation, the voice quality is less impaired even with the almost ½ second round-trip delay inherent with GEOs. The effects of self-echos, however, can be further minimized using the following techniques.

In a system using a single CDMA code to share a CDMA channel, the parties could desynchronize their use of it, or each could delay a replica of their own transmission and "subtract" it out from the composite received transmission. The full proper waveform must be used in the subtraction. Cross-correlation between the replica and the received transmission can be utilized to determine the exact measure of the propagation delay.

In a system using two CDMA codes to share a CDMA channel, the self-returned portion of the received transmission is perceived as noise by virtue of the incoherence between the two codes. This is similar to the situation with voice overlap. As a result, the effects of the delayed echo is minimized and negligible.

It is worthy to note that propagation delay automatically eliminates the effect of voice overlap when the amount is small. Consider first a conversation where there is no delay. Assume that user B causes an overlap on user A by beginning an utterance α seconds before A has finished. This overlap is of duration α. Assume a satellite channel with full one-way delay denoted β. With a GEO satellite, β≅0.25 second, and a full round-trip delay is 0.5 second. As B receives and listens to A's transmission, B would tend to interrupt at the same point in the message, which would again create an overlap of duration α at the tail end of A's current message. But B's response would not return to ground until β seconds later. If α≦β, there is no voice overlap in the received transmission. This is a good example of propagation delay eliminating a voice overlap situation. Unfortunately, this benefit is limited by β, which may be too small for this to be adequately effective in practice. Another advantage of propagation delay is that users utilizing satellite links for vcnce tend to adapt their speech to the inherent delay. They are subtly "trained" by the system.

Signaling for SCC would be accomplished using the signaling technique employed by the satellite system where SCC is implemented For example, if a satellite system uses separate dedicated signaling channels for signaling, the same would apply for SCC. In another example, if a satellite system embeds the signaling with information transmissions, the same would hold true for Scc.

Synchronization is similar to SCC signaling. Where synchronization signals are continuously needed, either dedicated synchronization channels are needed or SCC would have to continue to carry the synchronization even though the information transmissions of each party in the pair are alternately suppressed. This may entail sustaining a small transmission (of the synchronization pulses), either for short temporal intervals or at a very reduced power-level sustained all the time and with the synchronization signals still spread over the full spectral band. The immediate impact in the latter treatment would be a slight reduction in the power allotment available for the information traffic in the calls. It is worthy to note that synchronization for satellite systems using CDMA depends in some measure upon whether the system utilizes synchronous or asynchronous CDMA.

Table 4 shows a summary of features for various implementations of SCC using different CDMA coding combinations.

TABLE 4

| Comparative Feature | Single Code | Two Codes, 1 per User | Two Codes, 1 per Direction |
| --- | --- | --- | --- |
| Each user uses 1 or 2 codes? | 1 | 1 | 1 |
| Both parties use same code? | Yes | No | Both use both (in different order) |
| Voice Overlap: code neutralizes? | No -- use de-synch. | Yes | Yes |
| Self-Echo: code neutralizes? | With de-synch. | Yes | Yes |
| Satellite switch needed? | No | Yes | No |

Figure 10:
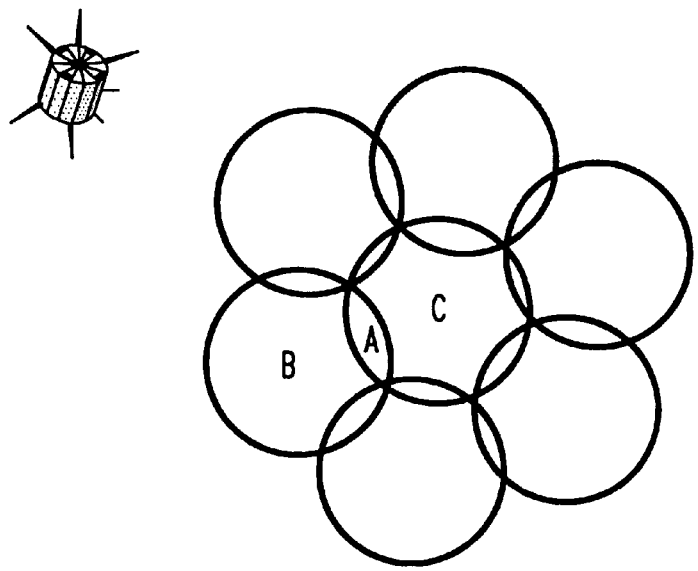
FIG. 10 illustrates spot-beam coverage for a satellite system in accordance with one embodiment of the invention.

FIG. 10 illustrates spot-beam coverage for a satellite system in accordance with one embodiment of the invention. Many satellite systems plan on using overlapping spot beams to obtain complete coverage of target market regions and to optimize system capacity through spectrum reuse. SCC offers the capability to extend the benefits of efficient channel utilization and the resulting economic advantages across the overlapping beams for users in the beam overlap coverage area.

The principle problem in beam overlap is radio frequency interference from one beam into the adjacent beams. In general, with conventional cellular techniques, the spectrum reuse conforms to the seven cell repeat pattern as used in most analog and TDMA wireless systems today. With the advent of CDMA methods, frequency reuse approaching the theoretical limit is feasible.

SCC provides the capability of selecting the most appropriate beam on a call by call basis in an overlapping beam coverage area. This capability is implemented by selecting the appropriate beam (e.g., beam code and polarization in a CDMA system) to complete an intrabeam call to the called party.

As indicated in FIG. 10, user A in the beam overlap region can call intrabeam to both user B and user C. Assuming a uniform distribution of subscribers within the beam, 35% of the subscribers within any specific beam will have the unique capability of calling intra-beam to an adjacent beam; this represents 21% of the total subscribers in the total coverage area. If the beam overlap region is strategically positioned, this can be used to almost double the local calling area of users within that zone.

Figure 11:
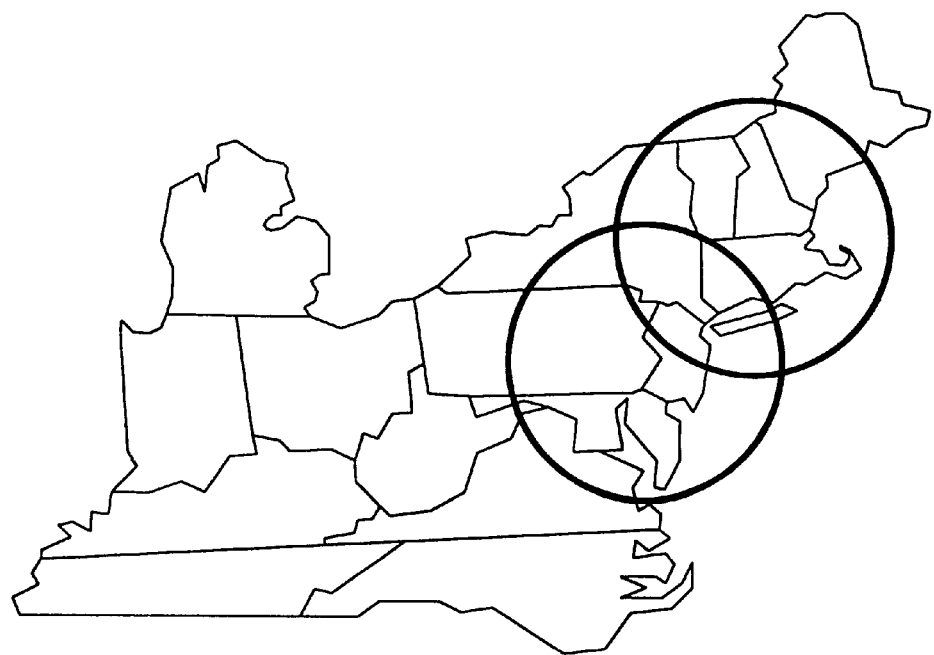
FIG. 11 illustrates spot-beam coverage having two-spot beams overlapping in accordance with one embodiment of the invention.

FIG. 11 illustrates spot-beam coverage having two-spot beams overlapping in accordance with one embodiment of the invention. FIG. 11 shows an overlap zone positioned on the New York metropolitan area that provides an extended local calling area across two beams. Thus, for example, New Yorkers can call on a beam centered on Boston and on one centered on Washington D.C. Furthermore, there may be economic reasons and traffic patterns which suggest a high level of beam overlap. For example, where additional traffic density and calling patterns warrant increased system capacity.

Consequently, the degree of beam overlap and positions should be treated as deployment variables in any satellite system employing SCC. The economic advantages of intra-beam SCC can be leveraged using this approach. The resulting extended local calling area could be an added differentiate for any multiple-spot-beam system.

Although SCC increases the capacity for satellite systems, it also provides additional advantages for satellite systems. For example, SCC can significantly reduce switching requirements in the satellite, particularly for some options.

As much of the voice, facsimile and other traffic can be expected to be intra-beam, a corresponding proportion of the channels on up-link and down-link can be paired at the outset, so that switching to align them is obviated. With FDMA, specific frequency channels would be aligned; with CDMA the wider spectral bands (as 10 MHZ) would be aligned. Regardless of whether up/down links are aligned a priori, SCC impacts satellite switching requirements in accordance with its impact on channel capacity itself. By assigning paired-users in a voice call to the same channel, thereby releasing a channel, the users share the one same switch for their assigned channel, thereby releasing the switch associated with the released channel. The switching demand is halved, just as is the channel capacity requirement. Thus, the satellite's processing requirement is halved, or rather the switch resource is doubled, as is the channel resource.

In a satellite system using SCC and having two CDMA codes with each party having their own code, the satellite must do processing with each call in order to map an up-link call under one CDMA code to a down-link call under the other CDMA code. This mapping/switching function must be done continually for the call, decoding and then re-encoding each transmission.

By using two CDMA codes wherein each code is carried forth for the full transmission in its respective direction, the mapping is eliminated. The satellite then acts as a bent-pipe, with no switching/mapping, and thus the processing is not needed. Complexity is thus moved from the satellite to the ground. Thus, this SCC configuration provides three main advantages: (1) it diminishes the effect of voice overlap to simply be a slight additional noise factor; (2) at the same time it acts as an echo canceler and eliminates the effect of propagation-delayed echo; and (3) it reduces the on-board satellite processing/switch requirement by dispensing with the need to do CDMA code-mapping between paired codes.

For any proposed satellite system intended to provide services that could potentially benefit from a SCC architectural design, clear assessment should be made of incorporating SCC features to expand the service potential, or to modify the service mix itself in order to maximize net revenue based on an optimized use of SCC. It is worthy to note that SCC lends itself to better utilizing existing architectural designs with modest modification.

The full equal-accessibility to both ends of the same one-way channel within a spot beam and its value as a capacity multiplier for paired parties in a voice call (other traffic types as well), where the alternating transmissions are concatenated onto a single shared one-way channel, opens the way for a marked advance in efficiency of satellite systems. SCC could be designed into a system architecture at the outset, or added to established satellite systems.

Although SCC provides a capacity doubling in system capacity for voice calls and other interactive two-way communications, SCC is really a capacity multiplier concept. For in a teleconference, the capacity in each beam is multiplied by the number of participants in that beam. And the overall capacity increase for the teleconference may be greater than two. Or viewed another way, just as an ordinary SCC voice call requires only one instead of two one-way channels, so the teleconference of n speakers requires less than n channels, so long as at least 2 participants are in the same beam. If all n are in the same beam, then the capacity has been increased n-fold, as all of those participants could then share the same single one-way channel within the beam.

Although a preferred embodiment is specifically illustrated and described herein, it will be appreciated that modifications and variations of the present invention are covered by the above teachings and within the purview of the appended claims without departing from the spirit and intended scope of the invention. For example, although a specific satellite system was used in various embodiments of the invention, it can be appreciated that SCC works with any conventional satellite system. Further, although specific medium access techniques were discussed for various embodiments of the invention, it can be appreciated that any medium access technique permitting bandwidth to be shared among multiple users can utilize the advantages of SCC.

What is claimed is:

1. A satellite system using a one-way channel to provide interactive two-way communications between communication sites located within a single satellite beam, comprising:

a receiver at a first communication site for receiving a first set of information signals on the one-way channel, said first set of information signals being generated by a first user using a second communication site;

a voice activity detector coupled to said receiver for detecting said first set of information signals, and generating a first detection signal when said first set of information signals are detected, and a second detection signal when said first set of information signals are not detected;

a transmitter for transmitting a second set of information signals to said second communication site on the one-way channel, said second set of information signals being generated by a second user using said first communication site;

a silence power suppressor coupled to said voice activity detector for receiving said detection signal, and coupled to said transmitter for turning power to said transmitter off in response to said first detection signal, and turning power to said transmitter on in response to said second detection signal.

2. The system of claim 1, wherein said second user can turn said transmitter on by generating said second set of information signals.

3. The system of claim 1, further comprising a talkover blocking device coupled to said transmitter for preventing said second user from turning said transmitter on by generating said second set of information signals.

4. The system of claim 1, further comprising a self-echo suppression device coupled to said receiver for canceling a delayed return signal generated by the satellite system when said second set of information signals is transmitted.

* * * * *